United States Patent
Wang

(10) Patent No.: US 7,225,218 B2
(45) Date of Patent: May 29, 2007

(54) APPARATUS AND METHODS FOR GENERATING COUNTS FROM BASE VALUES

(75) Inventor: Xuesong Wang, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 493 days.

(21) Appl. No.: 10/106,297

(22) Filed: Mar. 25, 2002

(65) Prior Publication Data

US 2003/0182345 A1 Sep. 25, 2003

(51) Int. Cl.
*G06F 7/50* (2006.01)

(52) U.S. Cl. .................................................. 708/670

(58) Field of Classification Search ............... 708/670; 377/49
See application file for complete search history.

(56) References Cited

U.S. PATENT DOCUMENTS

| | | | | |
|---|---|---|---|---|
| 5,764,550 A | * | 6/1998 | D'Souza | 708/233 |
| 6,363,408 B1 | * | 3/2002 | Khan et al. | 708/670 |
| 6,631,393 B1 | * | 10/2003 | Dai | 708/710 |
| 6,832,235 B1 | * | 12/2004 | Muramatsu et al. | 708/710 |

* cited by examiner

*Primary Examiner*—Tan V. Mai
(74) *Attorney, Agent, or Firm*—Townsend and Townsend and Crew LLP

(57) ABSTRACT

An apparatus for generating a plurality of counts is provided. A first adder is coupled to receive n least significant bits of a base count and a plurality of signals indicative of a plurality of values to be added to the base count, each of the plurality of values corresponding to one of a plurality of counts to be generated. The first adder generates, for each of the plurality of counts, n least significant bits of the count, and generates a plurality of carry signals. A second adder is coupled to receive most significant bits of the base count and the plurality of carry signals. The second adder generates, for each of the plurality of counts, most significant bits of the count.

18 Claims, 12 Drawing Sheets

| MASK bits 3:0 | BIT ADD1L0 | BITS 1:0 |  |  | BITS 2:0 |  |  |  | BITS 3:0 |  |  |  | ADDL0_OR_4 |
|---|---|---|---|---|---|---|---|---|---|---|---|---|---|
|  |  | ADD2L0 | ADD2L1 | ADD2L2 | ADD3L0 | ADD3L1 | ADD3L2 | ADD3L3 | ADD4L04 | ADD4L1 | ADD4L2 | ADD4L3 |  |
| 0000 | 0 | 1 | 0 | 0 | 1 | 0 | 0 | 0 | 1 | 0 | 0 | 0 | 0 |
| 0001 | 1 | 0 | 1 | 0 | 0 | 1 | 0 | 0 | 0 | 1 | 0 | 0 | 0 |
| 0010 | 0 | 0 | 1 | 0 | 0 | 1 | 0 | 0 | 0 | 1 | 0 | 0 | 0 |
| 0011 | 1 | 0 | 0 | 1 | 0 | 0 | 1 | 0 | 0 | 0 | 1 | 0 | 0 |
| 0100 | 0 | 1 | 0 | 0 | 0 | 1 | 0 | 0 | 0 | 1 | 0 | 0 | 0 |
| 0101 | 1 | 0 | 1 | 0 | 0 | 0 | 1 | 0 | 0 | 0 | 1 | 0 | 0 |
| 0110 | 0 | 0 | 1 | 0 | 0 | 0 | 1 | 0 | 0 | 0 | 1 | 0 | 0 |
| 0111 | 1 | 0 | 0 | 1 | 0 | 0 | 0 | 1 | 0 | 0 | 0 | 1 | 0 |
| 1000 | 0 | 1 | 0 | 0 | 1 | 0 | 0 | 0 | 0 | 1 | 0 | 0 | 0 |
| 1001 | 1 | 0 | 1 | 0 | 0 | 1 | 0 | 0 | 0 | 0 | 1 | 0 | 0 |
| 1010 | 0 | 0 | 1 | 0 | 0 | 1 | 0 | 0 | 0 | 0 | 1 | 0 | 0 |
| 1011 | 1 | 0 | 0 | 1 | 0 | 0 | 1 | 0 | 0 | 0 | 0 | 1 | 0 |
| 1100 | 0 | 1 | 0 | 0 | 0 | 1 | 0 | 0 | 0 | 0 | 1 | 0 | 0 |
| 1101 | 1 | 0 | 1 | 0 | 0 | 0 | 1 | 0 | 0 | 0 | 0 | 1 | 0 |
| 1110 | 0 | 0 | 1 | 0 | 0 | 0 | 1 | 0 | 0 | 0 | 0 | 1 | 0 |
| 1111 | 1 | 0 | 0 | 1 | 0 | 0 | 0 | 1 | 1 | 0 | 0 | 0 | 1 |

FIG. 4

APPARATUS AND METHODS FOR GENERATING COUNTS FROM BASE VALUES

BACKGROUND OF THE INVENTION

The present invention relates generally to methods and apparatus for fast addition. More particularly, the present invention relates to quickly generating a plurality of counts from a base count.

In microprocessors, it can be efficient to process a subset of instructions out of their original order. However, it is often necessary to actually execute subsets of the instructions in their original order. For instance, a first instruction may generate a result that is to be used as an argument of a second instruction. If the second instruction were to be executed prior to the first instruction, the second instruction would generate an incorrect result. Therefore, it would be useful to generate identifiers for the instructions that indicate a particular order in which to execute the instructions. However, such identifiers would need to be generated extremely quickly given the clock speed of typical microprocessors.

What is needed are techniques for quickly generating identifiers that can be used to execute instruction in a correct order.

BRIEF SUMMARY OF THE INVENTION

Embodiments of the present invention relate to fast generation of a plurality of counts from a base count. Particularly, for each of the plurality of counts, a corresponding value is added to the base count. In some specific embodiments, "speculative" addition techniques may be used to generate one or more of the plurality of counts.

According to one specific embodiment of the present invention, an apparatus for generating a plurality of counts is provided. This apparatus includes a first adder coupled to receive n least significant bits of a base count and a plurality of signals indicative of a plurality of values to be added to the base count, each of the plurality of values corresponding to one of a plurality of counts to be generated. In this specific embodiment, n is greater than one. The first adder generates, for each of the plurality of counts, n least significant bits of the count, and generates a plurality of carry signals. The apparatus also includes a second adder coupled to receive most significant bits of the base count and the plurality of carry signals. The second adder generates, for each of the plurality of counts, most significant bits of the count.

According to another embodiment, a method of generating a plurality of counts, each count including least significant bits and most significant bits, is provided. The method includes receiving a base count and a plurality of signals indicative of a plurality of values to be added to the base count. The method also includes, for each of the plurality of counts, generating the corresponding least significant bits based on the base count and the plurality of signals. The method additionally includes generating a first plurality of carry signals based on the base count and the plurality of signals. The method further includes, for each of the plurality of counts, in parallel with generating the corresponding least significant bits and with generating the first plurality of carry signals, generating a plurality of possible values for the corresponding most significant bits based on the base count. The method still further includes, for each of the plurality of counts, selecting one of the plurality of possible values for the corresponding most significant bits based on the first plurality of carry signals.

According to another aspect of the present invention, an adder for computing a plurality of additions of a base value with a sequence of monotonically increasing values, the sequence having a lower portion and an upper portion, wherein the lower portion includes an uppermost value, is provided. The adder includes a lower speculative adder coupled to receive the base value and a plurality of signals indicative of the values of the lower portion. The lower speculative adder generates a plurality of lower sums corresponding to the values of the lower portion, the lower sums including an uppermost lower sum corresponding to the uppermost value of the lower portion. The adder also includes an upper speculative adder coupled to receive a plurality signals indicative of the values of the upper portion minus the uppermost value of the lower portion, and to receive the uppermost lower sum. The upper speculative adder generates a plurality of upper sums corresponding to the values of the upper portion.

According to yet another embodiment of the present invention, a method for generating a plurality of additions of a base value with a sequence of monotonically increasing values, the sequence having a lower portion and an upper portion, wherein the lower portion includes an uppermost value, is provided. The method includes receiving the base value and a plurality of signals indicative of the values of the lower portion, and generating a plurality of lower sums based on the base value and the plurality of signals indicative of the values of the lower portion. The plurality of lower sums includes an uppermost lower sum corresponding to the uppermost value of the lower portion. The method additionally includes receiving a plurality of signals indicative of the values of the upper portion minus the uppermost value of the lower portion, and generating a plurality of upper sums based on the plurality of signals indicative of the values of the upper portion and the uppermost lower sum.

According to yet another aspect of the present invention, an apparatus for generating a plurality of signals indicative of a number of logical ones in a mask is provided. The apparatus includes logic that generates a first plurality of signals indicative of a number of logical ones in a first portion of the mask. The apparatus also includes a plurality of multiplexers, each multiplexer of the plurality of multiplexers coupled to receive at least one of the first plurality of signals as data input and to receive, as control input, at least one signal based on at least one bit in a second portion of the mask. The first plurality of multiplexers generates a second plurality of signals indicative of a number of logical ones in the first and second portions of the mask.

According to still another embodiment of the present invention, a method for generating a plurality of signals indicative of a number of logical ones in a mask is provided. The method includes generating a first plurality of signals indicative of a number of logical ones in a first portion of the mask based on the first portion of the mask. The method additionally includes generating a second plurality of signals indicative of a number of logical ones in the first portion of the mask and a second portion of the mask based on the first plurality of signals and the second portion of the mask.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 4 is a table illustrating generation of lower addition amount signals corresponding to the lower four bits of a mask according to one embodiment of the invention;

DETAILED DESCRIPTION OF SPECIFIC EMBODIMENTS

Figure 1:
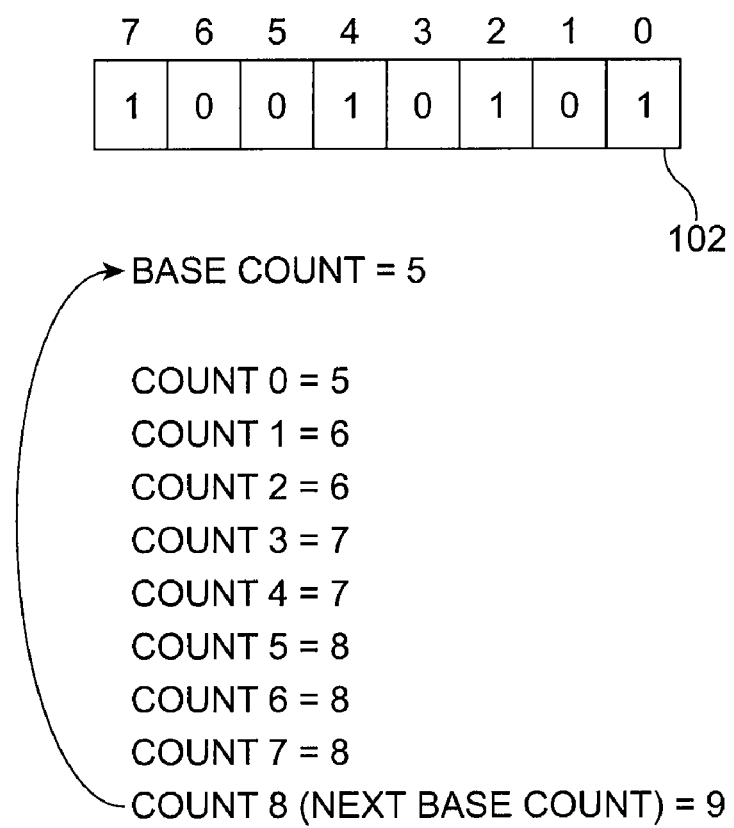
FIG. 1 is an example illustrating one approach for helping to ensure that instructions are executed in a particular order.

FIG. 1 is an example illustrating one approach for helping to ensure that instructions are executed in a particular order by a microprocessor. A mask 102 is associated with eight instructions. The eight instructions can be, for example, a group of eight instructions fetched from a cache. Mask 102 indicates which of the eight instructions should be executed in order. In this example, mask 102 indicates that instruction 0 should be executed prior to instruction 2, which should be executed prior to instruction 4, which should be executed prior to instruction 7. In order to ensure that the correct ordering is kept, a plurality of counts are generated, each count corresponding to one of the eight instructions associated with the mask.

Additionally, the counts are generated with reference to a base count. Use of the base count allows the ordering of instructions across multiple eight-instruction groups. In this example, the base count is five.

As illustrated in FIG. 1, nine counts are to be generated. Count 0 through count 7 correspond to the eight instructions associated with mask 102. Particularly, count 0 corresponds to instruction 0, count 1 corresponds with instruction 1, etc. Count 0 through count 7 is associated with instruction 0 through instruction 7 in order to ensure that they are executed in a proper order. Count 8 is used to update the base count value. Thus, when the next eight instructions are fetched from the cache, the base count value will be 9.

In a particular microprocessor system in which a specific embodiment of present invention is implemented, it is required that the nine counts be generated within one clock cycle of the microprocessor. It has been determined that traditional techniques for generating additions and/or incrementing numbers are too slow for such a requirement. However, fast new techniques have been developed.

Figure 2:
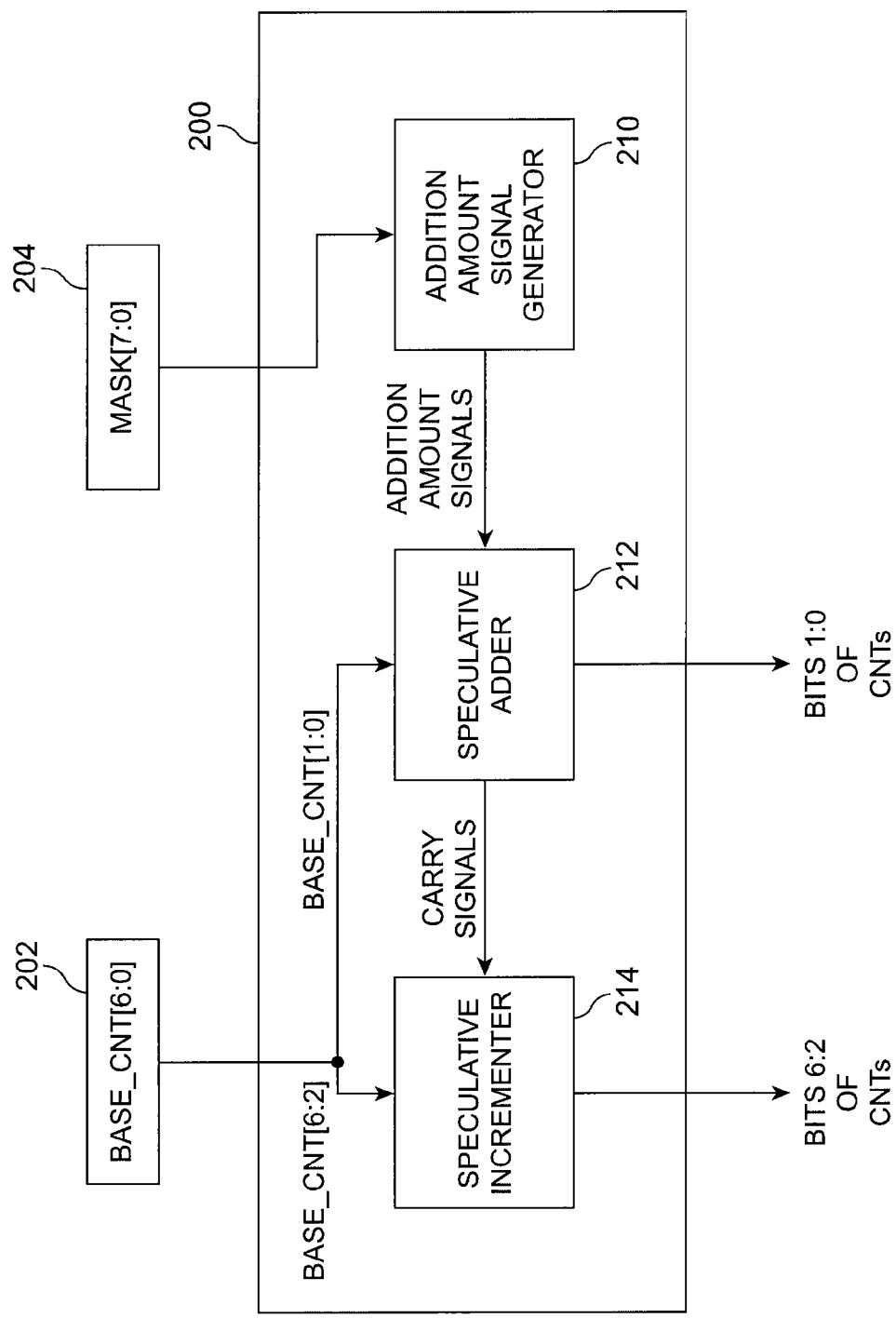
FIG. 2 is a simplified block diagram illustrating one embodiment according to the present invention.

FIG. 2 illustrates one specific embodiment according to the present invention for quickly generating a plurality of counts. A count generator 200 receives a base count value and a mask, and generates a plurality of counts. Referring again to FIG. 1, count generator 200 generates count 0, count 1, . . . , count 8. The base count value and mask value can be, for example, stored in respective registers 202 and 204. In this specific embodiment, the base count value and each of the count values are 7-bit, unsigned, fixed-point numbers, and the mask is an 8-bit value.

Count generator 200 comprises an addition amount signal generator 210, a speculative adder 212, and a speculative incrementer 214. Addition amount signal generator 210 receives the mask value and generates addition amount signals, which will be described in more detail subsequently. Speculative adder 212 receives bits [1:0] of the base count and the addition amount signals from the addition amount signal generator 210. In response, speculative adder 212 generates bits [1:0] of each of count 0, count 1, . . . , count 8. Additionally, speculative adder 212 generates carry signals. Speculative incrementer 214 receives bits [6:2] of the base count value as well as the carry signals generated by speculative adder 212. In response, speculative incrementer 214 generates bits [6:2] of each of count 0, count 1, . . . , count 8. Speculative adder 212 and speculative incrementer 214 are referred to as "speculative" as they generate, in parallel, multiple possible sums/increments, and then select the appropriate sum/increment.

Figure 3:
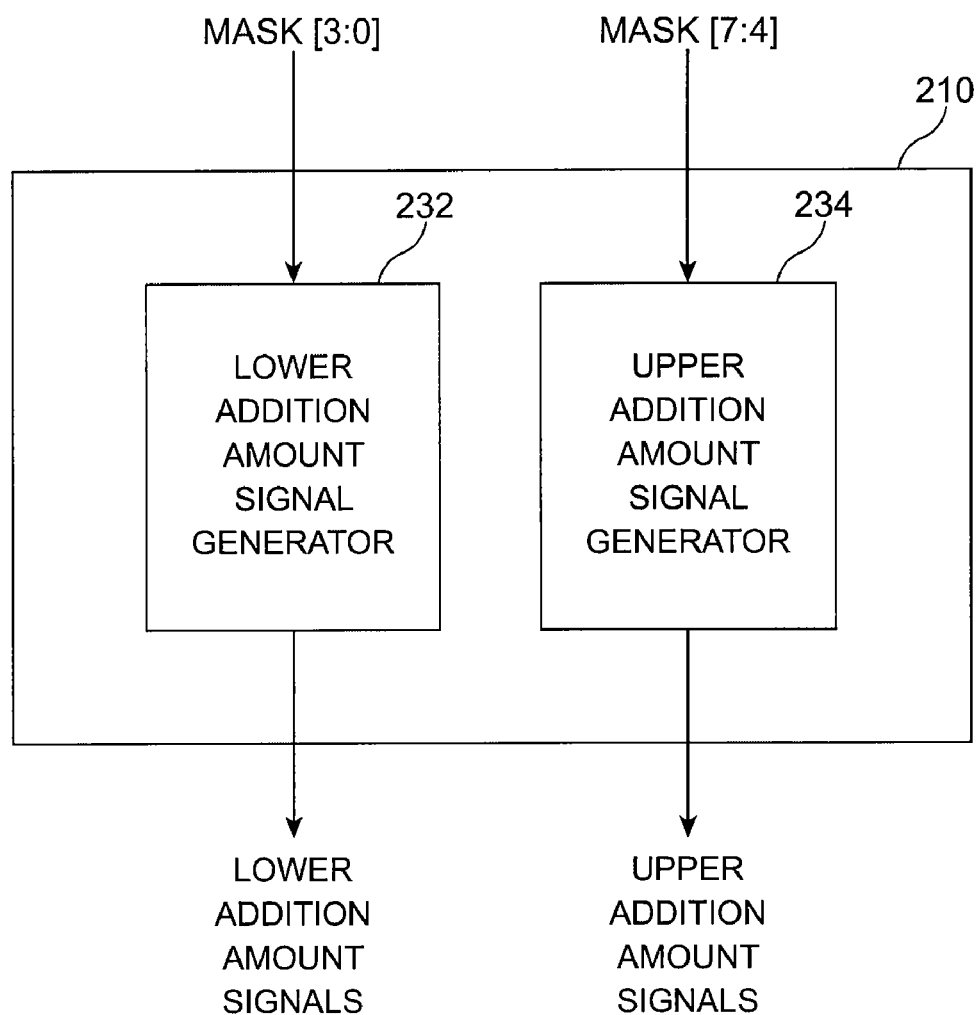
FIG. 3 is a simplified block diagram illustrating one embodiment of an addition amount signal generator.

FIG. 3 is a simplified block diagram illustrating one specific embodiment of addition amount signal generator 210, which comprises a lower addition amount signal generator 232 and an upper addition amount signal generator 234. Lower addition amount signal generator 232 receives the lower four bits of the mask and generates corresponding addition amount signals. Upper addition amount signal generator 234 receives the upper four bits of the mask and generates corresponding addition amount signals.

FIG. 4 is a table illustrating the generation of lower addition amount signals corresponding to the lower four bits of the mask. The lower addition amount signals comprise signals ADD1L, ADD2L0, ADD2L1, ADD2L2, ADD3L0, ADD3L1, ADD3L2, ADD3L3, ADD4L04, ADD4L1, ADD4L2, ADD4L3 and ADDL0_OR_4. Signal ADD1L indicates whether bit 0 of the mask is a one or a zero. Signals ADD2L0, ADD2L1 and ADD2L2 indicate how many ones are in bits 1:0 of the mask (i.e. 0, 1 or 2). Particularly, if there are zero ones, then signal ADD2L0 is high and signals ADD2L1 and ADD2L2 are low. If one of bits 1:0 of the mask are a one, then signal ADD2L1 is high and signals ADD2L0 and ADD2L2 are low. If both of bits 1:0 of the mask are one, then signal ADD2L2 is high and signals ADD2L0 and ADD2L1 are low. Similarly, signals ADD3L0, ADD3L1, ADD3L2 and ADD3L3 indicate how many ones are in bits 2:0 of the mask (i.e. 0, 1, 2 or 3). Also, signals ADD4L04, ADD4L1, ADD4L2, ADD4L3 and ADDL0_OR_4 indicate how many ones are in bits 3:0 of the mask (i.e. 0, 1, 2, 3 or 4). In particular, if bits 3:0 of the mask are all zeros, then signal ADD4L04 is high and signal ADDL0_OR_4 is low, and if bits 3:0 of the mask are all ones, then signal ADD4L04 is high and signal ADDL0_OR_4 is high.

Upper addition amount signals comprise signals ADD1U, ADD2U0, ADD2U1, ADD2U2, ADD3U0, ADD3U1, ADD3U2, ADD3U3, ADD4U04, ADD4U1, ADD4U2, ADD4U3 and ADDU0_OR_4. These signals are generated similarly to lower addition amount signals as illustrated in FIG. 4. But upper addition amount signals are generated based on bits 7:4 of the mask. Thus, signal ADD1U indicates whether bit 4 of the mask is a one or a zero. Signals ADD2U0, ADD2U1 and ADD2U2 indicate how many ones are in bits 5:4 of the mask (i.e. 0, 1 or 2). Similarly, signals ADD3U0, ADD3U1, ADD3U2 and ADD3U3 indicate how many ones are in bits 6:4 of the mask (i.e. 0, 1, 2 or 3). Also, signals ADD4U04, ADD4U1, ADD4U2, ADD4U3 and ADDU0_OR_4 indicate how many ones are in bits 7:4 of the mask (i.e. 0, 1, 2, 3 or 4).

Figure 5A:
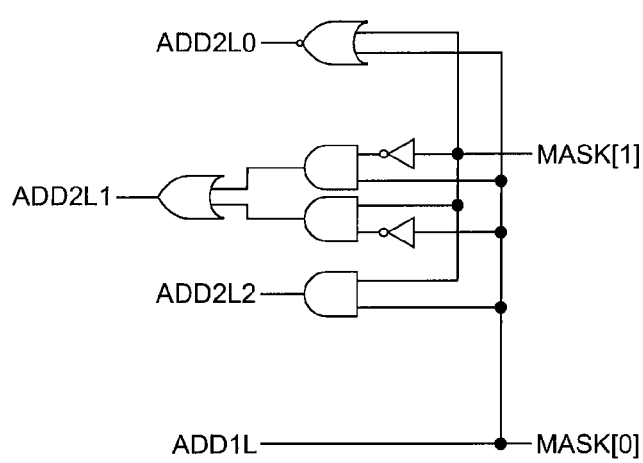
FIGS. 5A, 5B and 5C are simplified circuit diagrams illustrating one embodiment of a lower addition amount signal generator.
Figure 5B:
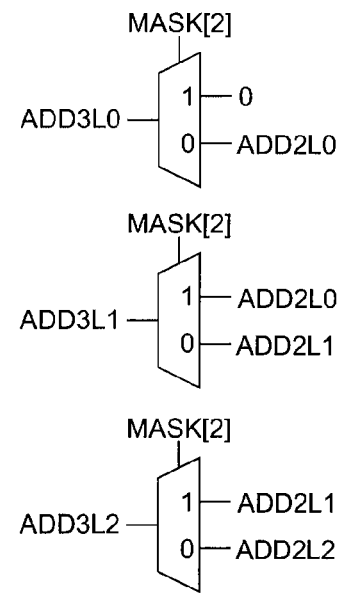
Figure 5C:
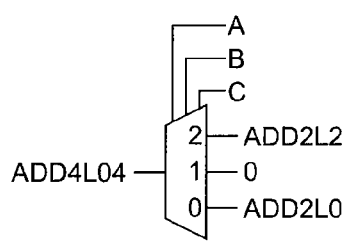
Figure 5C:
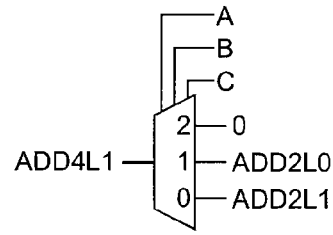
Figure 5C:
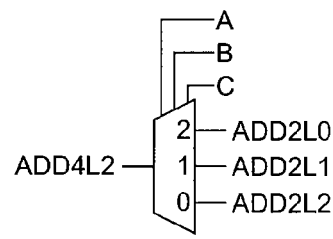
Figure 5C:
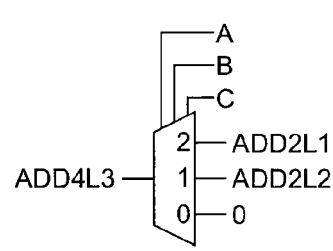
Figure 5C:
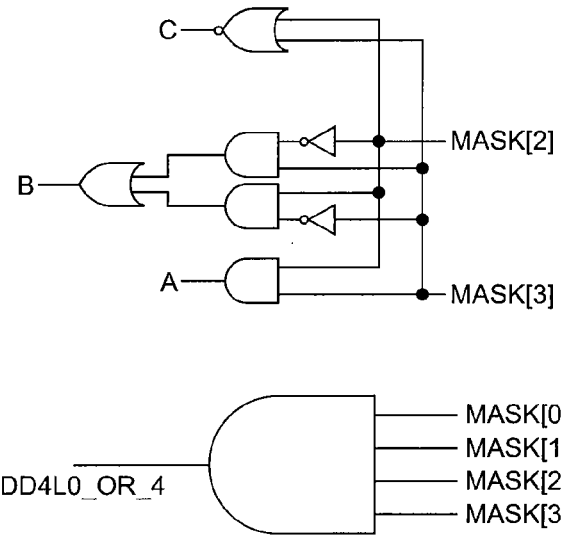

FIGS. 5A, 5B and 5C are simplified circuit diagrams illustrating one specific embodiment of lower addition amount signal generator 232. FIG. 5A illustrates logic for generating signals ADD1L, ADD2L0, ADD2L1 and ADD2L2. As can be seen, signal ADD1L is merely bit 0 of the mask, and signals ADD2L0, ADD2L1 and ADD2L2 can be generated with simple logic. FIG. 5B illustrates circuits for generating signals ADD3L0, ADD3L1, ADD3L2 and ADD3L3. Particularly, each signal corresponds to the output of a two-input multiplexer. Each multiplexer receives, as data input, one or more of data signals ADD2L0, ADD2L1 and ADD2L2, and each multiplexer receives, as control input, bit 2 of the mask. If bit 2 of the mask is 0, then the 0 inputs of the multiplexers are selected, and, if bit 2 of the mask is 1, then the 1 inputs of the multiplexers are selected.

FIG. 5C illustrates circuits for generating signals ADD4L04, ADD4L1, ADD4L2, ADD4L3 and ADDL0_OR_4. Particularly, each signal corresponds to the output of a three-input multiplexer. Each multiplexer receives, as data input, one or more of data signals ADD2L0, ADD2L1 and ADD2L2, and each multiplexer receives, as control input, control signals A, B and C. If control signal A is high, then the 0 inputs of the multiplexers are selected. If control signal B is high, the 1 inputs of the multiplexers are selected. And, if control signal C is high, the 2 inputs of the multiplexers are selected. Control signals A, B and C are generated from bits 2 and 3 of the mask using simple logic as shown. Further, signal ADDL0_OR_4 is generated as the AND of bits 3:0 of the mask.

In this specific embodiment, upper addition amount signal generator 234 is implemented similarly to the implementation of lower addition amount signal generator 232 illustrated in FIGS. 5A, 5B and 5C.

Figure 6:
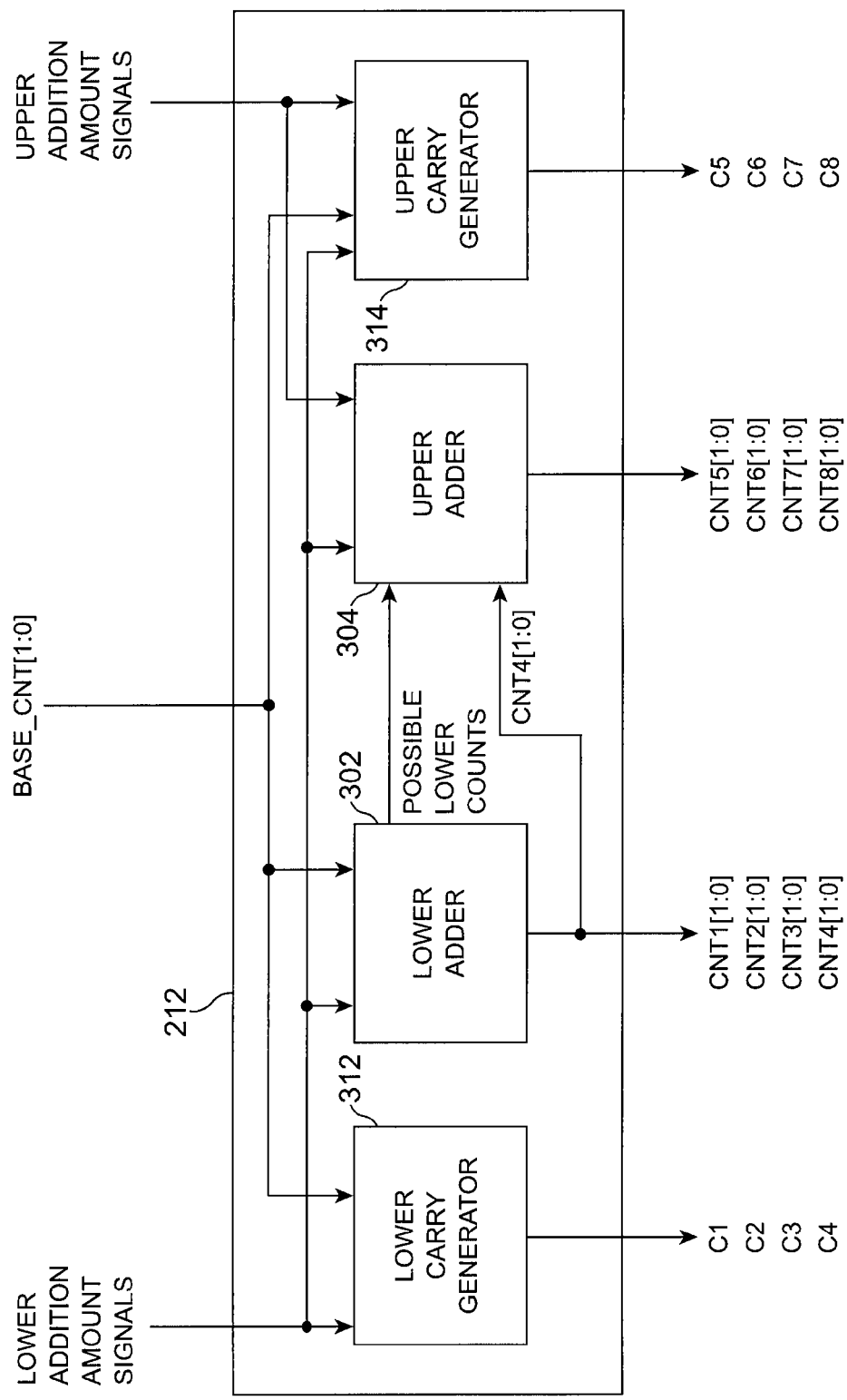
FIG. 6 is a simplified block diagram illustrating one embodiment of a speculative adder.

FIG. 6 is a simplified block diagram illustrating one particular embodiment of speculative adder 212 of FIG. 2. Speculative adder 212 comprises a lower adder 302, an upper adder 304, a lower carry generator 312 and an upper carry generator 314. Lower adder 302 receives bits 1:0 of the base count as well as lower addition amount signals generated by lower addition amount signal generator 232 (FIG. 3), and generates bits 1:0 of count 1 through count 4, (i.e., CNT1[1:0], CNT2[1:0], CNT3[1:0] and CNT4[1:0]). Upper adder 304 receives lower addition amount signals generated by lower addition amount signal generator 232 (FIG. 3), CNT4[1:0] from lower adder 302, as well as the upper addition amount signals generated by upper addition amount signal generator 234 (FIG. 3), and generates bits 1:0 of count 5 trough count 8, (i.e., CNT5[1:0], CNT6[1:0], CNT7[1:0] and CNT8[1:0]). Lower carry generator 312 receives lower addition amount signals and generates carry signals C1, C2, C3 and C4, Upper carry generator 314 receives upper addition amount signals and generates carry signals C5, C6, C7 and C8.

As can be seen, lower adder 302 and upper adder 304 operate in parallel to generate bits 1:0 of count 1 through count 8, except that upper adder 304 uses one output of lower adder 302 (i.e., CNT4[1:0]). Additionally, lower carry generator 312 and upper carry generator 314 operate in parallel to generate carry signals C1 through C8. It has been found that such parallelization significantly increases the speed of the generation of bits 1:0 of the count 1 through count 8 and the carry out signals C1 through C8.

Figure 7:
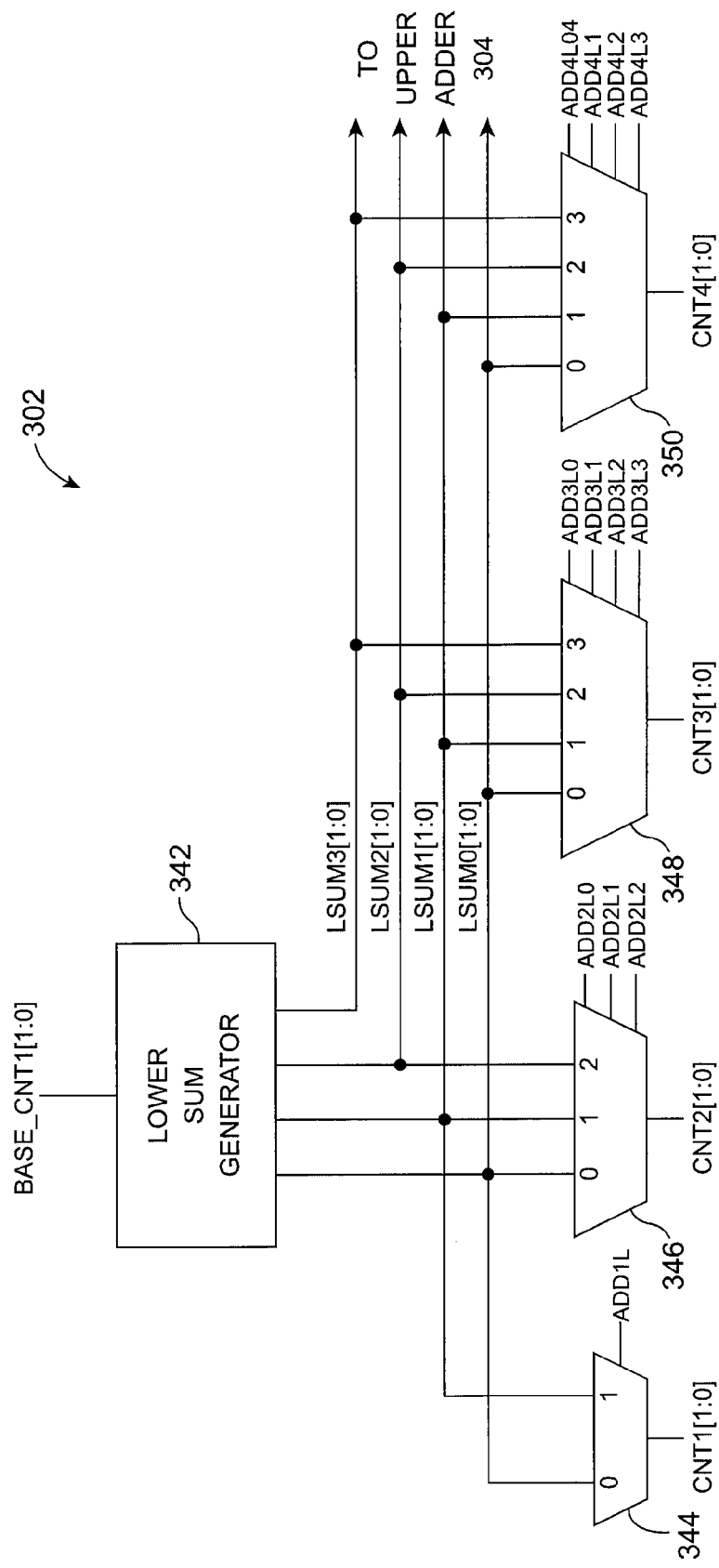
FIG. 7 is a simplified block diagram illustrating one embodiment of an adder.

FIG. 7 is a simplified block diagram illustrating one specific embodiment of lower adder 302. In this embodiment, lower adder 302 comprises a lower sum generator 342 and a plurality of multiplexers 344, 346, 348 and 350. Lower sum generator 342 receives bits 1:0 of the base count and generates possible sums that would be needed for the generation of bits 1:0 of count 1 through count 4. Then, multiplexers 344, 346, 348 and 350 each select the appropriate sum controlled by the lower addition amount signals.

For instance, count 1 (CNT1) corresponds to bit 0 of the mask. If bit 0 of the mask were zero, then CNT1[1:0] would merely be BASE_CNT[1:0]. If bit 0 of the mask were one, then CNT1[1:0] would be BASE_CNT[1:0] plus one. Thus, the possible sums for CNT1[1:0] are BASE_CNT[1:0] plus zero and BASE_CNT[1:0] plus one. In FIG. 7, lower sum generator 342 generates a signal LSUM0[1:0], which is BASE_CNT[1:0] plus zero, and generates a signal LSUM1[1:0], which is BASE_CNT[1:0] plus one. These signals are provided to multiplexer 344 as data inputs. Multiplexer 344, receives as control input, signal ADD1L, and generates bits 1:0 of CNT1. Particularly, when signal ADD1L is a logical zero, then multiplexer 344 selects LSUM0[1:0] (BASE_CNT[1:0] plus zero) as its output. When ADD1L is a logical one, then multiplexer 344 selects LSUM1[1:0] (BASE_CNT[1:0] plus one) as its output.

Count 2 (CNT2) corresponds to bits 1:0 of the mask. The possible sums for CNT2[1:0] are BASE_CNT[1:0] plus zero, BASE_CNT[1:0] plus one and BASE_CNT[1:0] plus two. As described above, lower sum generator 342 generates signal LSUM0[1:0], which is BASE_CNT[1:0] plus zero, and generates signal LSUM1[1:0], which is BASE_CNT[1:0] plus one. Additionally, lower sum generator 342 generates a signal LSUM2[1:0], which is BASE_CNT[1:0] plus two. These signals are provided to multiplexer 346 as data inputs. Multiplexer 346, receives as control inputs, signals ADD2L0, ADD2L1 and ADD2L2, and generates bits 1:0 of CNT2. Particularly, when signal ADD2L0 is a logical one, then multiplexer 346 selects LSUM0[1:0] (BASE_CNT[1:0] plus zero) as its output. When ADD2L1 is a logical one, then multiplexer 346 selects LSUM1[1:0] (BASE_CNT[1:0] plus one) as its output. And, when ADD2L2 is a logical one, then multiplexer 346 selects LSUM2[1:0] (BASE_CNT[1:0] plus two) as its output.

Similarly, count 3 (CNT3) corresponds to bits 2:0 of the mask. The possible sums for CNT3[1:0] are BASE_CNT[1:0] plus zero, BASE_CNT[1:0] plus one, BASE_CNT[1:0] plus two, and BASE_CNT[1:0] plus three. As described above, lower sum generator 342 generates signals LSUM0[1:0] (BASE_CNT[1:0] plus zero), LSUM1[1:0] (BASE_CNT[1:0] plus one) and LSUM2[1:0] (BASE_CNT[1:0] plus two). Additionally, lower sum generator 342 generates a signal LSUM3[1:0], which is BASE_CNT[1:0] plus three. These signals are provided to multiplexer 348 as data inputs. Multiplexer 348, receives as control inputs, signals ADD3L0, ADD3L1, ADD3L2 and ADD3L3, and generates bits 1:0 of CNT3. Particularly, when signal ADD3L0 is a logical one, then multiplexer 348 selects LSUM0[1:0] (BASE_CNT[1:0] plus zero) as its output. When ADD3L1 is a logical one, then multiplexer 348 selects LSUM1[1:0] (BASE_CNT[1:0] plus one) as its output. When ADD3L2 is a logical one, then multiplexer 348 selects LSUM2[1:0] (BASE_CNT[1:0] plus two) as its output. And, when ADD3L3 is a logical one, then multiplexer 348 selects LSUM3[1:0] (BASE_CNT[1:0] plus three) as its output.

Count 4 (CNT4) corresponds to bits 3:0 of the mask. The possible sums for CNT3[1:0] are BASE_CNT[1:0] plus zero, BASE_CNT[1:0] plus one, BASE_CNT[1:0] plus two, BASE_CNT[1:0] plus three and BASE_CNT[1:0] plus four. But, for bits 1:0 of CNT4, BASE_CNT[1:0] plus zero and BASE_CNT[1:0] plus four are the same. Thus, the signals LSUM0[1:0], LSUM1[1:0], LSUM2[1:0] and LSUM3[1:0] are provided to multiplexer 350 as data inputs. Multiplexer 350, receives as control inputs, signals ADD4L04, ADD4L1, ADD4L2 and ADD4L3, and generates bits 1:0 of CNT4. Particularly, when signal ADD4L04 is a logical one, then multiplexer 350 selects LSUM0[1:0] (BASE_CNT[1:0] plus zero) as its output. When ADD4L1 is a logical one, then multiplexer 350 selects LSUM1[1:0] (BASE_CNT[1:0] plus one) as its output. When ADD4L2 is a logical one, then multiplexer 350 selects LSUM2[1:0] (BASE_CNT[1:0] plus two) as its output. And, when ADD4L3 is a logical one, then multiplexer 350 selects LSUM3[1:0] (BASE_CNT[1:0] plus three) as its output.

Figure 8:
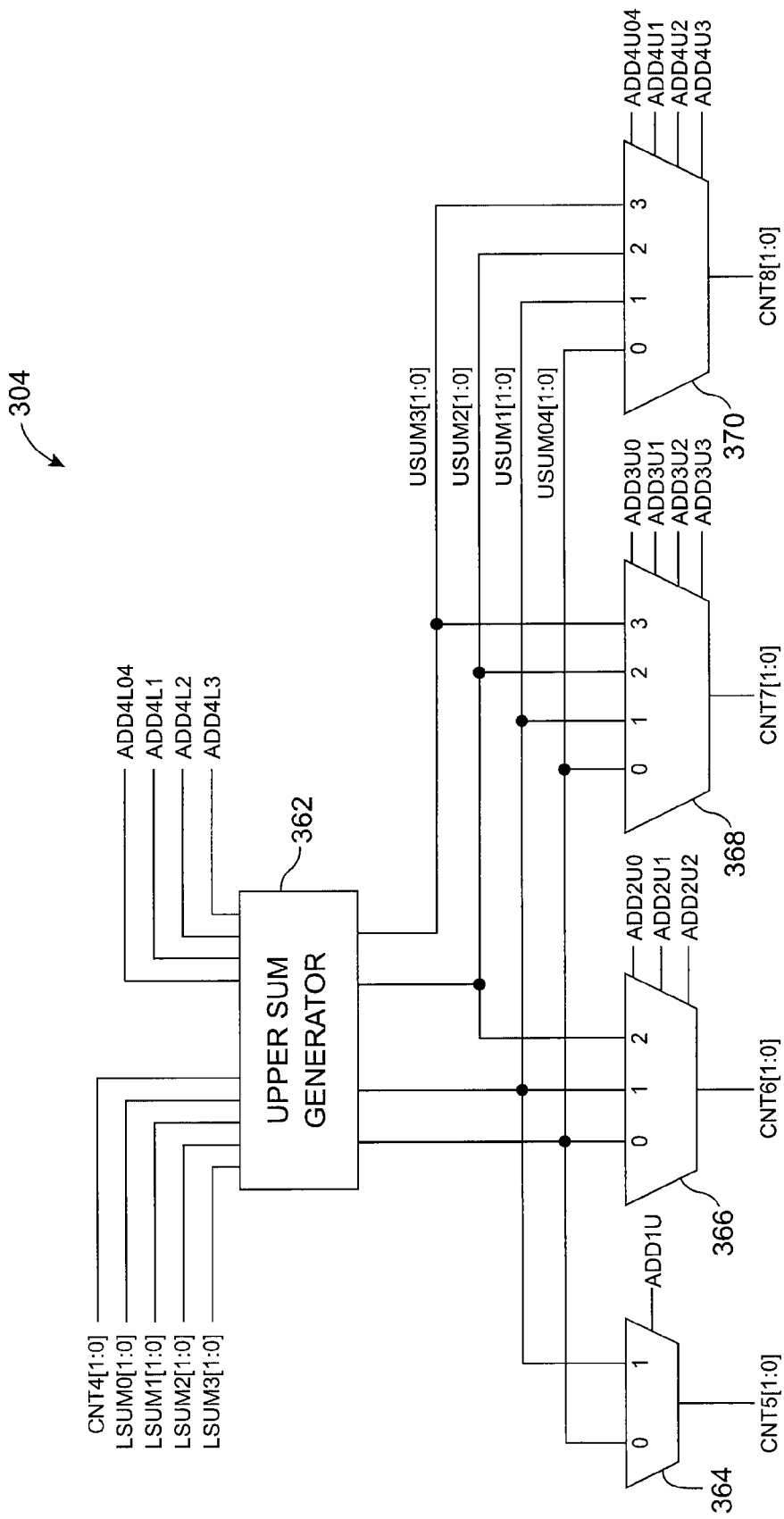
FIG. 8 is a simplified block diagram illustrating one embodiment of another adder.

FIG. 8 is a simplified block diagram illustrating one specific embodiment of upper adder 304. As can be seen, this embodiment is similar to the lower adder 302 illustrated in FIG. 7. Upper sum adder 304 generates bits 1:0 for count 5 through count 8. Count 5 through count 8 can be determined based on count 4. For instance, count 5 (CNT5) corresponds to bits 4:0 of the mask. If bit 4 of the mask were zero, then CNT5[1:0] would merely be CNT4[1:0]. If bit 4 of the mask were one, then CNT5[1:0] would be CNT4[1:0] plus one.

Upper adder 304 comprises an upper sum generator 362 and a plurality of multiplexers 364, 366, 368 and 370. Upper sum generator 362 receives CNT4[1:0] generated by lower adder 302, possible lower sum signals LSUM0, LSUM1, LSUM2 and LSUM3, also generated by lower adder 302, and at least a subset of lower addition amount signals (i.e., ADD4L04, ADD4L1, ADD4L2 and ADD4L3). Upper sum generator 362 generates possible sums that would be needed for the generation of bits 1:0 of count 5 through count 8. Then, multiplexers 364, 366, 368 and 370 each select the appropriate sum controlled by the upper addition amount signals. The selection of appropriate sums by multiplexers 364, 366, 368 and 370 is similar to that described with respect to the embodiment of lower adder 302 illustrated in FIG. 7.

Figure 9:
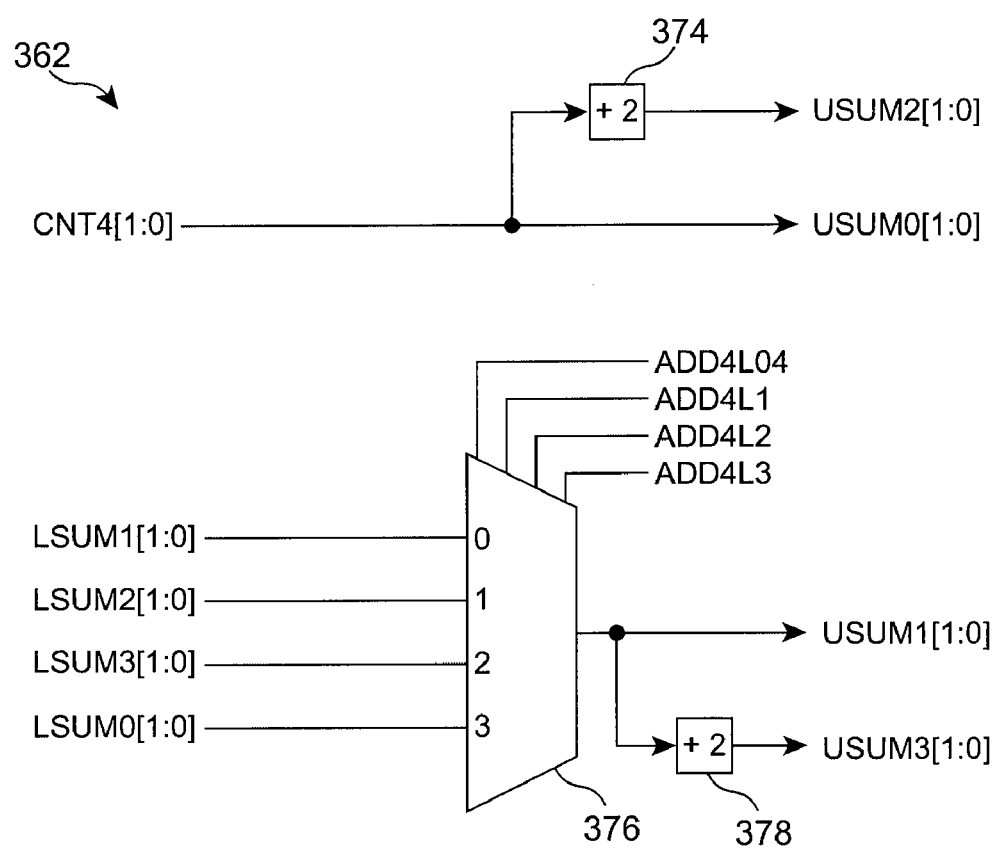
FIG. 9 is a simplified block diagram illustrating one embodiment of a sum generator.

FIG. 9 is a simplified block diagram of one specific embodiment of upper sum generator 362. Upper sum generator 362 generates possible sums corresponding to CNT4 plus zero (USUM0[1:0]), CNT4 plus one (USUM1[1:0]), CNT4 plus two (USUM2[1:0]) and CNT4 plus three (USUM3[1:0]). Upper sum generator 362 comprises an adder 374, a multiplexer 376 and an adder 378. Adder 374 receives CNT4 and generates CNT4 plus two. As is well known to those skilled in the art, adding two to a two-bit number can be accomplished relatively quickly. However, adding one or three to a two-bit number is slower because more logic is required. Therefore, signals LSUM0, LSUM1, LSUM2 and LSUM3 are used to generate signals USUM1 and USUM3, which correspond, respectively, to CNT4 plus one and CNT4 plus three.

Particularly, signals LSUM0, LSUM1, LSUM2 and LSUM3 are provided as data inputs to multiplexer 376, which receives, as control inputs, signals ADD4L04, ADD4L1, ADD4L2 and ADD4L3. As can be seen in FIG. 9, the data inputs to multiplexer 376 are shifted, such that the output of multiplexer 376 is CNT4[1:0] plus one (USUM1[1:0]). For instance, if ADD4L04 is a logical one, then LSUM1[1:0] is selected. If ADD4L1 is a logical one, then LSUM2[1:0] is selected. If ADD4L2 is a logical one, then LSUM3[1:0] is selected. If ADD4L3 is a logical one, then LSUM0[1:0] is selected. Further, adder 378 receives USUM1[1:0] and generates USUM3[1:0].

Referring again to FIG. 2, speculative adder 212 generates carry signals that are provided to speculative incrementer 214. Referring now to FIG. 6, these carry signals are generated by lower carry generate 312 and upper carry generator 314. Lower carry generator 312 generates carry signals C1, C2, C3 and C4, which correspond to CNT1, CNT2, CNT3 and CNT4, respectively. Specifically, carry signals C1, C2, C3 and C4 are used by speculative incrementer 214 to generate the upper bits of the count 1 through count 4, i.e., CNT1[6:2], CNT2[6:2], CNT3[6:2] and CNT4[6:2], respectively. Similarly, upper carry generator 314 generates carry signals C5, C6, C7 and C8, which correspond to CNT5, CNT6, CNT7 and CNT8, respectively. Specifically, carry signals C5, C6, C7 and C8 are used by speculative incrementer 214 to generate the upper bits of count 5 through count 8, i.e., CNT5[6:2], CNT6[6:2], CNT7[6:2] and CNT8[6:2], respectively.

Figure 10:
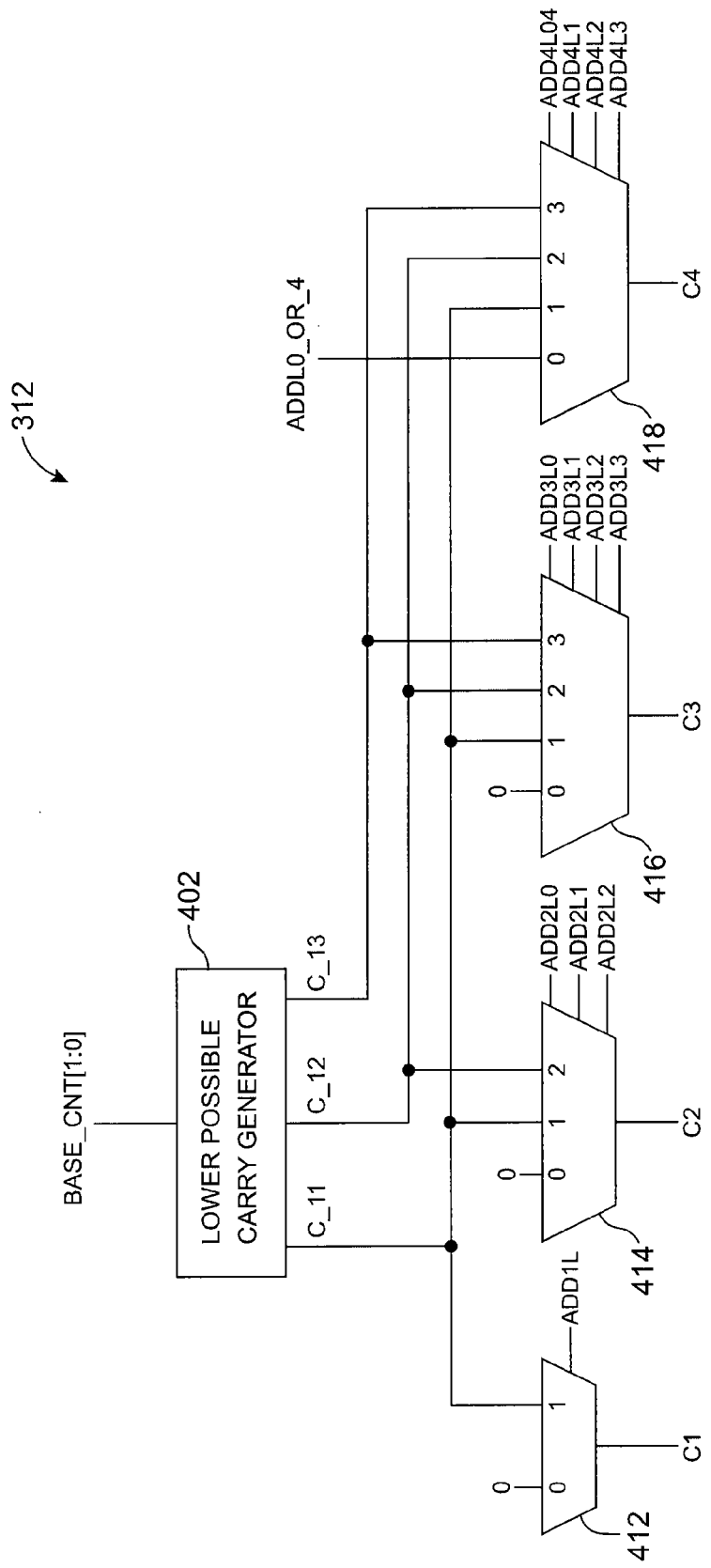
FIG. 10 is a simplified block diagram illustrating one embodiment of a carry generator.

FIG. 10 is a simplified block diagram of one specific embodiment of lower carry generator 312. Lower carry generator 312 generates carry signals that indicate whether the upper bits (i.e., bits 6:2) of a particular lower count (i.e., count 1, count 2, count 3 or count 4) need be incremented. Lower carry generator comprises a lower possible carry generator 402, and multiplexers 412, 414, 416 and 418.

As described above, count 1 (CNT1) corresponds to bit 0 of the mask, and the possible sums for CNT1 are BASE_CNT[1:0] plus zero and BASE_CNT[1:0] plus one. As an example, a carry could be required for CNT1 if bit 0 of the mask were high and BASE_CNT[1:0] were the value 3. Thus, a possible carry occurs for CNT1 when BASE_CNT[1:0] is the value 3. Similarly, possible carries for count 2 through count 4 can be determined based on the values of BASE_CNT[1:0]. For example, if CNT2 required an addition of one to BASE_CNT[1:0], then a carry would be generated if BASE_CNT[1:0] were the value 3. Also, if CNT2 required an addition of two to BASE_CNT[1:0], then a carry would be generated if BASE_CNT[1:0] were the values 2 or 3. Table 1 is a logic table indicating when carries are required according to various additions (i.e., add zero, add one, add two, add three or add four), where b0 is BASE_CNT[0] and b1 is BASE_CNT[1]. As can be seen from Table 1, adding zero and adding four are trivial cases, in that adding zero never involves a carry, and adding four always generates a carry.

TABLE 1

| SUM | CARRY |
| --- | --- |
| +0 | 0 |
| +1 | b0 AND b1 |
| +2 | b1 |
| +3 | b0 OR b1 |
| +4 | 1 |

Referring again to FIG. 10, lower possible carry generator 402 generates possible carries C_l1, C_l2 and C_l3. Particularly, C_l1 is generated as b0 AND b1 merely b1, and C_l3 is b0 OR b1. One or more of C_l1, C_l2 and C_l3 are p inputs, to multiplexers 412, 414, 416 and 418. For instance, multiplexer 412 is provided as C_l1 as a data input. When the control signal ADD1L is low, logic 0 is selected, and when ADD1L is high, C_l1 is selected. Similarly, multiplexer 414 is provided C_l1 and C_l2 as a data inputs. When the control signal ADD2L0 is high, logic 0 is selected. When ADD2L1 is high, C_l1 is selected, and, when ADD2L2 is high, C_l2 is selected. Similarly, multiplexer 416 is provided C_l1, C_l2, and C_l3 as a data inputs. When the control signal ADD3L0 is high, logic 0 is selected, and when ADD3L1 is high, C_l1 is selected. When ADD3L2 is high, C_l2 is selected, and, when ADD3L3 is high, C_l3 is selected. With regard to multiplexer 418, the signal ADDL0_OR_4, and signals C_l1, C_l2, and C_l3 are provide data inputs. When the control signal ADD4L04 is high, ADDL0_OR_4 is selected, and when ADD4L1 is high, C_l1 is selected. When ADD4L2 is high, C_l2 is selected, and, when ADD4L3 is high, C_l3 is selected.

Figure 11:
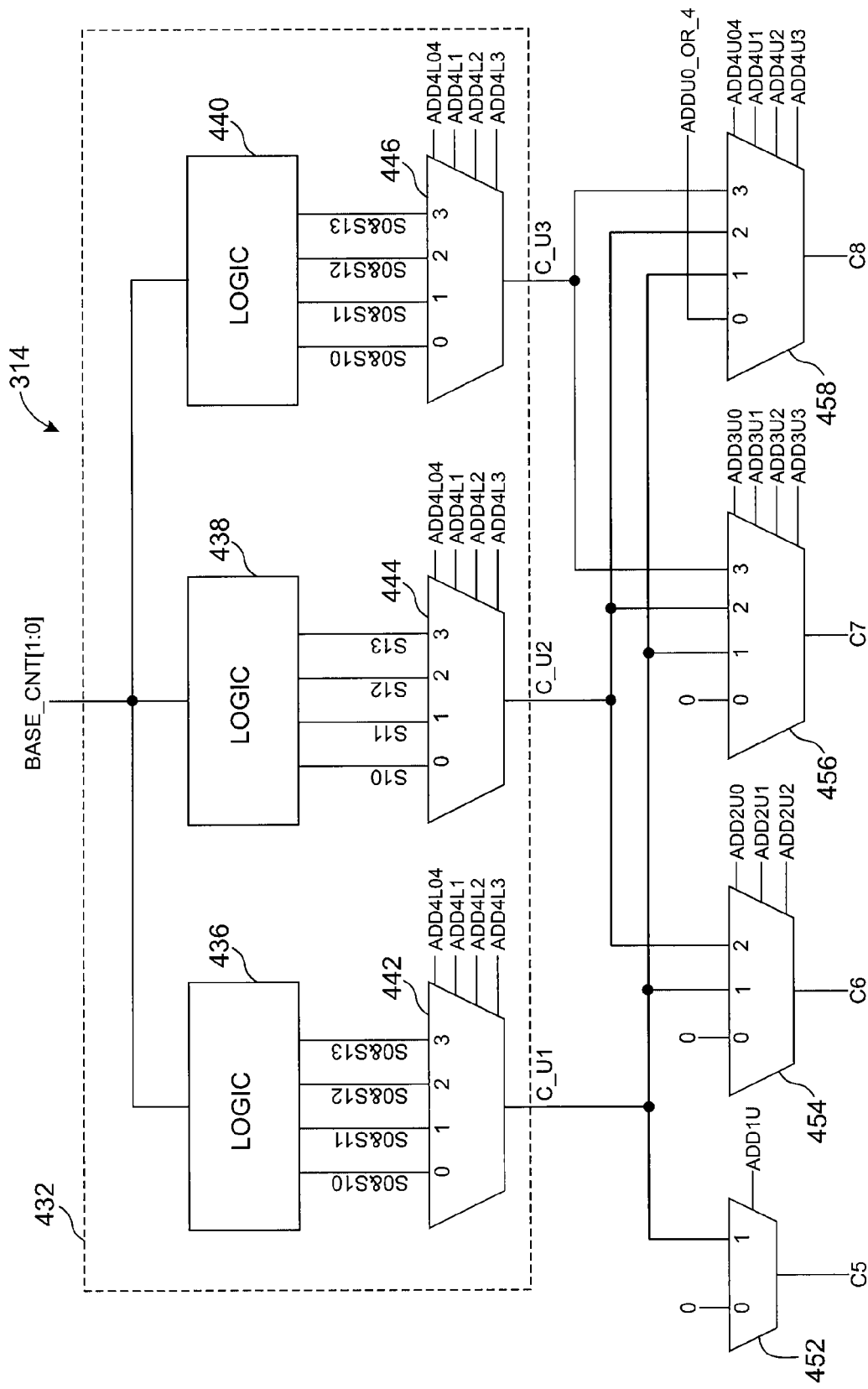
FIG. 11 is a simplified block diagram illustrating one embodiment of another carry generator.

FIG. 11 is a simplified block diagram of one specific embodiment of upper carry generator 314. Similar to lower carry generator 312, upper carry generator 314 generates carry signals that indicate whether the upper bits (i.e., bits 6:2) of a particular upper count (i.e., count 5, count 6, count 7 or count 8) need be incremented. Upper carry generator comprises an upper possible carry generator 432, and multiplexers 452, 464, 456 and 458.

As described above, count 5 (CNT5) corresponds to bits 4:0 of the mask, and the possible sums for CNT5 are CNT4[1:0] plus zero and CNT4[1:0] plus one. As an example, a carry could be required for CNT5 if bit 4 of the mask were high and CNT4[1:0] were the value 3. Thus, a possible carry occurs for CNT5 when CNT4[1:0] is the value 3. Similarly, possible carries for count 6 through count 8 can be determined based on the values of CNT4[1:0]. For example, if CNT6 required an addition of one to CNT4[1:0], then a carry would be generated if CNT4[1:0] were the value 3. Also, if CNT6 required an addition of two to CNT4[1:0], then a carry would be generated if CNT4[1:0] were the values 2 or 3. Table 2 is a logic table indicating when carries are required according to various additions (i.e., add zero, add one, add two, add three or add four), where S0 is CNT4[0] and b1 is CNT4[1]. As can be seen from Table 2, adding zero and adding four are trivial cases, in that adding zero never involves a carry, and adding four always generates a carry.

TABLE 2

| SUM | CARRY |
|---|---|
| +0 | 0 |
| +1 | s0 AND s1 |
| +2 | s1 |
| +3 | s0 OR s1 |
| +4 | 1 |

Referring again to FIG. 11, upper possible carry generator 432 generates possible carries C_u1, C_u2 and C_u3. Particularly, C_u1 is generated as s0 is s1, and C_u3 is s0 OR s1. One or more of C_u1, C_u2 and C_u3 inputs, to multiplexers 452, 454, 456 and 458. These multiplexers select the appropriate carry signal in a manner similar to that of lower carry generator 312 described with respect to FIG. 10.

Rather than generate possible carries C_u1, C_u2 and C_u3 using CNT4[1:0] generated by lower adder 302, these values can be generated more quickly directly from BASE_CNT[1:0] as will be described below. Upper possible carry generator 432 comprises logic 436 for generating possible values of s0 AND s1, logic 438 for generating possible values of s1, and logic 440 for generating possible values of s0 OR s1. Particularly, logic 436 generates values s0 AND s1 when bits 4:0 indicate that CNT4[1:0] is BASE_CNT[1:0] plus zero, BASE_CNT[1:0] plus one, BASE_CNT[1:0] plus two and BASE_CNT[1:0] plus three. These possible values are provided, as data inputs, to multiplexer 442. Then, control signals ADD4L04, ADD4L1, ADD4L2 and ADD4L3 select the appropriate value. For instance, if ADD4L04 is high, then input s0 & s10 is selected. If ADD4L1 is high, then input s0 & s11 is selected. If ADD4L2 is high, then input s0 & s12 is selected. And, if ADD4L3 is high, then input s0 & s13 is selected.

Similarly, logic 438 generates possible values of s1. Particularly, logic 438 generates values s1 when bits 4:0 indicate that CNT4[1:0] is BASE_CNT[1:0] plus zero, BASE_CNT[1:0] plus one, BASE_CNT[1:0] plus two and BASE_CNT[1:0] plus three. These possible values are provided, as data inputs, to multiplexer 444. Then, control signals ADD4L04, ADD4L1, ADD4L2 and ADD4L3 select the appropriate value in a manner similar to that of multiplexer 442 described above.

Similarly, logic 440 generates possible values of s0 OR s1. Particularly, logic 440 generates values s0 OR s1 when bits 4:0 indicate that CNT4[1:0] is BASE_CNT[1:0] plus zero, BASE_CNT[1:0] plus one, BASE_CNT[1:0] plus two and BASE_CNT[1:0] plus three. These possible values are provided, as data inputs, to multiplexer 446. Then, control signals ADD4L04, ADD4L1, ADD4L2 and ADD4L3 select the appropriate value in a manner similar to that of multiplexer 442 described above.

Figure 12:
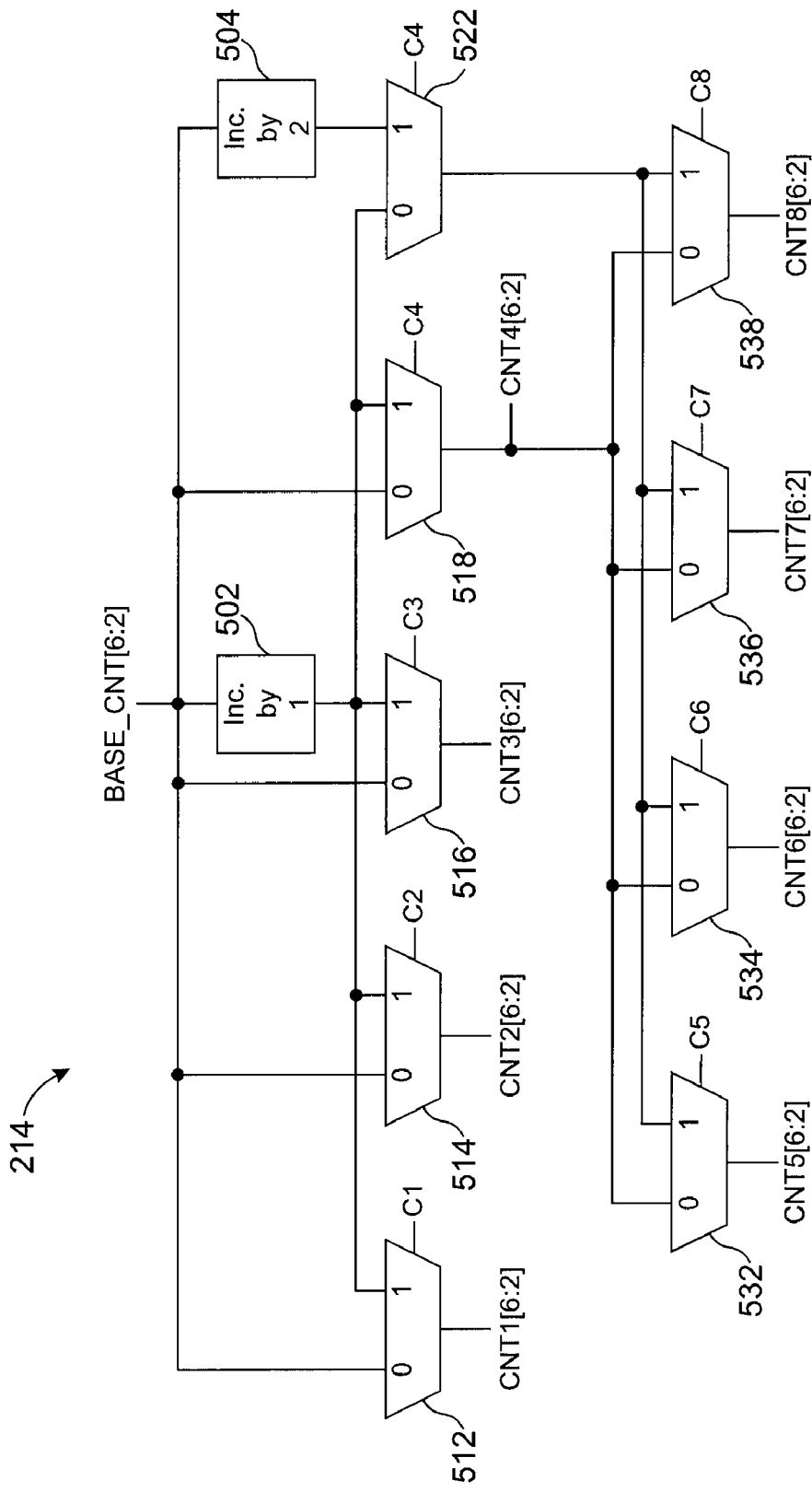
FIG. 12 is a simplified block diagram illustrating one embodiment of a speculative incrementer.

Referring again to FIG. 2, speculative incrementer 214 receives BASE_CNT[6:2] and carry signals from speculative adder 212, and generates the upper bits (i.e., bits 6:2) of count 1 through count 8. FIG. 12 is a simplified block diagram of one specific embodiment of speculative incrementer 214. Speculative incrementer 214 comprises an increment by one block 502, an increment by two block 504, and multiplexers 512, 514, 516, 518, 522, 532, 534, 536 and 538. As will be described in more detail below, the possible values of bits 6:2 of the various counts are generated in parallel, and then the appropriate counts are selected by the multiplexers.

For instance, as will be recognized by those skilled in the art, CNT1[6:2] through CNT4[6:2] will be either BASE_CNT[6:2] plus zero or BASE_CNT[6:2] plus one. Thus, the possible values for bits 6:2 of CNT1, CNT2, CNT3 and CNT4 are BASE_CNT[6:2] or BASE_CNT[6:2] plus one. The value BASE_CNT[6:2] is provided, as data input, to each of multiplexers 512, 514, 516, and 518. Additionally, increment by one block 502 receives BASE_CNT[6:2] and generates the value BASE_CNT[6:2] plus one, which is provided, as another data input, to each of multiplexers 512, 514, 516, and 518. Then, multiplexers 512, 514, 516, and 518 select the appropriate value as bits 6:2 for their corresponding count. For example, multiplexer 512 receives, as control input, carry signal C1 generated by lower carry generator 312. When C1 is low, CNT1[6:2] is selected as BASE_CNT[6:2], and when C1 is high, CNT1[6:2] is selected as BASE_CNT[6:2] plus one. Multiplexers 514, 516 and 518 similarly select the appropriate value for bits 6:2 of their respective count.

As will be recognized by those skilled in the art, CNT5[6:2] through CNT8[6:2] will be either CNT4[6:2] plus zero or CNT4[6:2] plus one. Thus, the possible values for bits 6:2 of CNT5, CNT6, CNT7 and CNT8 are CNT4[6:2] or CNT4[6:2] plus one. BASE_CNT[6:2] is provided to increment by two block 504, which generates BASE_CNT[6:2] plus two. Multiplexer 522 receives, as data input, the output of increment by one block 502 as well as the output of increment by two block 504. Additionally, multiplexer 522 receives, as control input, signal C4. When C4 is low, the output of multiplexer 522 will be BASE_CNT[6:2] plus one, and when C4 is high, the output of multiplexer 522 will be BASE_CNT[6:2] plus two. Thus, the output of multiplexer 522 is CNT4[6:2] plus one.

The output of multiplexer 518 (CNT4[6:2]) is provided, as data input, to multiplexers 532, 534, 536 and 538. Additionally, the output of multiplexer 522 (CNT4[6:2] plus one) is also provided, as data input, to multiplexers 532, 534, 536 and 538. Then, multiplexers 532, 534, 536, and 538 select the appropriate value as bits 6:2 for their corresponding count. For example, multiplexer 532 receives, as control input, carry signal C5 generated by upper carry generator 314. When C5 is low, CNT5[6:2] is selected as CNT4[6:2], and when C5 is high, CNT5[6:2] is selected as CNT4[6:2] plus one. Multiplexers 534, 536 and 538 similarly select the appropriate value for bits 6:2 of their respective count.

In view of the above disclosure, many other variations can be envisioned. For instance, although embodiments of the present invention have been described in the context of counts having 7 bits, other bit-lengths may be used as well. Similarly, although embodiments of the present invention have been described in the context of a mask having 8 bits, other bit-lengths may be used as well. Additionally, although embodiments of the present invention have been described in which a speculative adder generates the lower two bits of counts, in other embodiments, a lower speculative adder may generate other bits of the counts. Additionally, amounts for adding need not be derived from a mask. For instance, a plurality of registers could hold values to be added to a base value.

In other embodiments of the present invention, combinations or sub-combinations of the above-disclosed invention can be advantageously made. The block diagrams of the architecture are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. An apparatus for generating a plurality of counts, the apparatus comprising:
a first adder coupled to receive n least significant bits of a base count and a plurality of signals indicative of a plurality of values to be added to the base count, each of the plurality of values corresponding to one of a plurality of counts to be generated, the first adder generating, for each of the plurality of counts, n least significant bits of the count, and generating a plurality of carry signals; and
a second adder coupled to receive most significant bits of the base count and the plurality of carry signals, and that generates, for each of the plurality of counts, most significant bits of the count;
wherein n is an integer greater than one.

2. The apparatus of claim 1, wherein each of the plurality of values to be added to the base count is less than or equal to 2n+1.

3. The apparatus of claim 1, wherein the plurality of counts are ordered, the apparatus further comprising:
logic coupled to receive a mask that indicates which of the plurality counts should be incremented from a previous count, and that generates the plurality of signals indicative of the plurality of values.

4. The apparatus of claim 1, wherein the first adder comprises: a sum generator coupled to receive the n least significant bits of the base count and that generates a plurality of possible sums;
a plurality of sum multiplexers, each sum multiplexer coupled to receive, as data input, at least a subset of the plurality of possible sums, and to receive, as control input, at least a subset of the plurality signals indicative of the plurality of values to be added, each sum multiplexer generating then least significant bits of a corresponding one of the counts.

5. The apparatus of claim 4, wherein the first adder further comprises:
a carry generator coupled to receive the n least significant bits of the base count and that generates a plurality of possible carries; and
a plurality of carry multiplexers, each carry multiplexer coupled to receive, as data input, at least one of the plurality of possible carries and to receive, as control input, at least one of the plurality of signals indicative of the plurality of values to be added, and to generate one of the carries.

6. The apparatus of claim 1, wherein the plurality of counts comprises lower counts and upper counts;
wherein the plurality of carry signals comprises lower carry signals corresponding to the lower counts and upper carry signals corresponding to the upper counts;
wherein the plurality of signals indicative of the plurality of values to be added to the base count comprises lower signals corresponding to the lower counts and upper signals corresponding to the upper counts; and
wherein the first adder comprises:
a lower adder coupled to receive the n least significant bits of the base count and the lower signals, and that generates the n least significant bits of each of the lower counts, including an uppermost count, and the lower carryout signals;
an upper adder coupled to receive the upper signals and the uppermost count, and that generates then least significant bits of each of the upper counts and the upper carryout signals.

7. The apparatus of claim 6, wherein the lower adder comprises:
a lower sum generator coupled to receive the n least significant bits of the base count and that generates n least significant bits of each of a plurality of possible lower sums;
a plurality of lower sum multiplexers, each lower sum multiplexer coupled to receive, as data input, at least one of the plurality of possible lower sums, and to receive, as control input, at least one of the lower signals, and to generate the n least significant bits of one of the lower counts;
wherein the upper adder comprises:
an upper sum generator coupled to receive n least significant bits of at least one of the lower counts, and that generates n least significant bits of each of a plurality of possible upper sums; and
a plurality of upper sum multiplexers, each upper sum multiplexer coupled to receive, as data input, at least one of the plurality of possible upper sums, and to receive, as control input, at least one of the upper signals, and to generate the n least significant bits of one of the upper counts.

8. The apparatus of claim 7, wherein the first adder further comprises:
a lower carry generator coupled to receive the n least significant bits of the base count and that generates a plurality of possible lower carries;
a plurality of lower carry multiplexers, each lower carry multiplexer coupled to receive, as data input, at least a subset of the plurality of possible lower carries and to receive, as control input, at least one of the lower signals, and to generate one of the lower carries;
an upper carry generator coupled to receive the n least significant bits of the base count, and to receive a subset of the lower signals, and that generates a plurality of possible upper carries; and
a plurality of upper carry multiplexers, each upper carry multiplexer coupled to receive, as data input, at least a subset of the plurality of possible upper carries, and to receive, as control input, at least one of the upper signals, and to generate one of the upper counts.

9. The apparatus of claim 1, wherein the second adder comprises:
an increment generator coupled to receive the most significant bits of the base count and that generates a plurality of possible increments of the most significant bits; and
a plurality of increment multiplexers, each increment multiplexer coupled to receive, as data input, at least a subset of the plurality of possible increments, and to receive, as control input, at least one of the plurality of carry signals, and to generate most significant bits of one of the counts.

10. A method for a microprocessor for generating a plurality of counts, each count including least significant bits and most significant bits, the method comprising:
receiving a base count and a plurality of signals indicative of a plurality of values to be added to the base count;
for each of the plurality of counts, generating in at least a first portion of the microprocessor the corresponding least significant bits based on the base count and the plurality of signals;
generating in at least a second portion of the microprocessor a first plurality of carry signals based on the base count and the plurality of signals;
for each of the plurality of counts, in parallel with generating the corresponding least significant bits and with generating the first plurality of carry signals, generating in at least a third portion of the microprocessor a plurality of possible values for the corresponding most significant bits based on the base count;
for each of the plurality of counts, selecting in at least a fourth portion of the microprocessor one of the plurality of possible values for the corresponding most significant bits based on the first plurality of carry signals; and
for each of the plurality of counts, outputting the corresponding least significant bits generated in at least the first portion of the microprocessor and the value for the corresponding most significant bits selected in at least the fourth portion of the microprocessor, wherein each of the plurality of counts indicates an order of execution for an instruction in the microprocessor.

11. The method of 10, wherein the step of generating the corresponding least significant bits comprises:
generating in at least the second portion of the microprocessor a plurality of possible values for the corresponding least significant bits; and
selecting in at least the second portion of the microprocessor one of the plurality of possible values for the corresponding least significant bits based on a subset of the plurality of signals indicative of the plurality of values to be added to the base count.

12. An adder for computing a plurality of additions of a base value with a sequence of monotonically increasing values, the sequence having a lower portion and an upper portion, wherein the lower portion includes an uppermost value, the adder comprising:
a lower speculative adder coupled to receive the base value and a plurality of signals indicative of the values of the lower portion, and that generates a plurality of lower sums corresponding to the values of the lower portion, the lower sums including an uppermost lower sum corresponding to the uppermost value of the lower portion; and
an upper speculative adder coupled to receive a plurality signals indicative of the values of the upper portion minus the uppermost value of the lower portion, and to receive the uppermost lower sum, and that generates a plurality of upper sums corresponding to the values of the upper portion.

13. The adder of claim 12, wherein the lower speculative adder comprises: a lower sum generator coupled to receive the base value, and that generates a plurality of possible lower sums; and
a plurality of lower sum multiplexers, each lower sum multiplexer coupled to receive, as data input, at least one of the plurality of possible lower sums, and to receive, as control input, at least one of the plurality of signals indicative of the values of the lower portion, and that generates one of the lower sums.

14. The adder of claim 13, wherein the upper speculative adder comprises:
an upper sum generator coupled to receive the plurality of possible lower sums, to receive a subset of the plurality of signals indicative of the values of the lower portion, and to receive the uppermost lower sum, and that generates a plurality of possible upper sums; and
a plurality of upper sum multiplexers, each upper sum multiplexer coupled to receive, as data input, at least one of the plurality of possible upper sums, and to receive, as control input, at least one of the plurality of signals indicative of the values of the upper portion minus the uppermost value of the lower portion, and that generates one of the upper sums.

15. A method for a processing unit for generating a plurality of additions of a base value with a sequence of monotonically increasing values, the sequence having a lower portion and an upper portion, wherein the lower portion includes an uppermost value, the method comprising:
receiving the base value and a plurality of signals indicative of the values of the lower portion;
generating in at least a first portion of the processing unit a plurality of lower sums based on the base value and the plurality of signals indicative of the values of the lower portion, the plurality of lower sums including an uppermost lower sum corresponding to the uppermost value of the lower portion;
receiving a plurality of signals indicative of the values of the upper portion minus the uppermost value of the lower portion;

generating in at least a second portion of the processing unit a plurality of upper sums based on the plurality of signals indicative of the values of the upper portion and the uppermost lower sum; and outputting the plurality of lower sums and the plurality of upper sums, wherein the plurality of lower sums and the plurality of upper sums represent least significant bits of a plurality of counts, and wherein each of the plurality of counts indicates an order of execution for an instruction in the processing unit.

16. The method of claim 15, wherein generating the plurality of lower sums comprises:

generating in at least the first portion of the processing unit a plurality of possible lower sums; and for each of the plurality of lower sums, selecting in at least the first portion of the processing unit one of the plurality of lower sums from at least a subset of the plurality of lower sums based on at least a subset of the plurality of signals indicative of the values of the lower portion.

17. The method of claim 16, wherein generating the plurality of upper sums comprises:

generating in at least the second portion of the processing unit a plurality of possible upper sums; and for each of the plurality of upper sums, selecting in at least the second portion of the processing unit one of the plurality of upper sums from at least a subset of the plurality of upper sums based on at least a subset of the plurality of signals indicative of the values of the upper portion minus the uppermost value of the lower portion.

18. The method of claim 17, wherein generating the plurality of possible upper sums comprises generating in at least the second portion of the processing unit at least a subset of the plurality of possible upper sums based on the plurality of possible lower sums.

* * * * *